United States Patent [19] [11] 4,277,779
Rohrbacher [45] Jul. 7, 1981

[54] TIME CODE GENERATOR

[75] Inventor: Hans-Adolf Rohrbacher, Karlsdorf, Fed. Rep. of Germany

[73] Assignee: Kernforschungszentrum Karlsruhe GmbH, Karlsruhe, Fed. Rep. of Germany

[21] Appl. No.: 100,996

[22] Filed: Dec. 6, 1979

[30] Foreign Application Priority Data

Dec. 12, 1978 [DE]  Fed. Rep. of Germany ....... 2853541

[51] Int. Cl.³ .................... G08C 19/28; G08C 9/00
[52] U.S. Cl. ............................. 340/348; 340/870.01;
340/870.22; 368/47
[58] Field of Search ............... 340/348, 345, 351, 353,
340/359, 309.1, 177 R, 180, 188 R, 203, 189 R,
204, 206; 368/46, 47, 55; 178/79; 235/92 T;
364/569; 375/21, 25

[56] References Cited

U.S. PATENT DOCUMENTS

| 3,229,278 | 1/1966 | Hanson et al. | 340/353 |
| 3,472,019 | 10/1969 | Webb | 368/47 |
| 3,756,012 | 9/1973 | Kiss | 368/47 |
| 4,087,958 | 5/1978 | Ebihara et al. | 368/47 |

FOREIGN PATENT DOCUMENTS 2453299 5/1976 Fed. Rep. of Germany .

OTHER PUBLICATIONS

"Handbook of Precision Timekeeping and Tape Search", Systron–Donner Corp., Sep. 1974.

Primary Examiner—James J. Groody
Attorney, Agent, or Firm—Spencer & Kaye

[57] ABSTRACT

A time code generator for generating a time-coded pulse sequence comprising a digital clock for generating time information in a BCD code, six BCD-to-decimal coder stages each coupled to a corresponding output terminal of the digital clock and six binary multiplexer stages connected through a diode matrix to the BCD-to-decimal coder stages. A clock pulse generator for generating clock pulses at a predetermined frequency, a decoder coupled to the binary multiplexer stages, a follow-up counter for serially energizing the binary multiplexer stages and a frequency divider for controlling the clock pulse generator, follow-up counter, decoding and binary multiplexer stages are provided.

A NAND gate is coupled to the outputs of the binary multiplexer stages, a mode switch to the output of the NAND gate and a first and second output signal amplifiers are coupled to the mode switch.

5 Claims, 12 Drawing Figures

TIME CODE GENERATOR

BACKGROUND OF THE INVENTION

The present invention relates to a time code generator and, in particular, to apparatus for generating a time coded pulse sequence for synchronously marking a plurality of data carriers.

With increasing frequency, experimental data and measurement signals are recorded by devices which have different modes of operation such as visicorders, line recorders and analog magnetic tape recorders. When such devices are operated in parallel there arises the problem of evaluating the relationship with respect to time of the measured data. Difficulties arise, in particular, when independent measuring groups, each having their own measuring devices and recording instruments, work on the same experiment and must compare data for purposes of evaluation.

The known methods of marking time by way of handwritten notes on the data carrier or by verbal notes on a magnetic tape are merely aids and are, in general, unsatisfactory. This is particularly the case when rapid transient signal sequences are being studied. Further, the known method of employing event markers, e.g., in connection with line recorders, cannot be used for analog magnetic tape recorders since this system furnishes only synchronous pulses without time indications.

In another prior art method, disclosed in the "Handbook of Precision Timekeeping and Tape Search" published by the Systron-Donner Corporation, Concord, California, September 1974, page 95, sinusoidal oscillations at a predetermined constant frequency are used which are then rectangularly amplitude modulated according to a binary code (IRIG Standard Time Code). The principal drawback of this method is that the time code cannot be read without additional auxiliary means.

Also, German Offenlegungsschrift No. 2,453,299 describes a method of recording measured value curves by means of recording devices which are arranged at spatially separated locations and which are synchronized by a low frequency signal train recorded at all locations. The low frequency signal is obtained from the low frequency component of the outputs of radio receivers tuned to the same program. This system is disadvantageous in that, although time association of the data carriers is possible with the aid of significant signal sequences, it is complicated to carry out in practice, is of low accuracy and does not permit real time marking.

It is an object of the present invention to develop a time code generator with which it is possible to provide a marking track for data carriers containing measurement signals from different measuring devices, such as magnetic tape recorders, visicorders, line recorders, multichannel data collecting systems and high frequency cameras.

Another object is to provide a time code generator which generates synchronized real time markings even during long and/or interrupted recording periods when no characters are repeated for at least 24 hours, and which can be evaluated in a simple manner.

SUMMARY OF THE INVENTION

In accordance with the present invention, a simple circuit arrangement comprising tested components is provided which generates a ten-symbol code forming a time word. These symbols can be read optically at any point on a data carrier without any auxiliary means and can be recorded on the data carrier in real time and also as a predetermined time standard. The time identification can be acoustically read from magnetic tapes and no additional recording devices are required for rough evaluation. Further, synchronous time coding of the data carriers is possible with any desired number of recording devices and the time signals can be recorded in the FM, direct, AM or PCM modes. Also, with a time reference accuracy of $\pm 10^{-5}$ second per day, the time resolution can be selected to be between $5 \times 10^{-6}$ second to 10 seconds in a 24-hour cycle.

DESCRIPTION OF THE PREFERRED EMBODIMENTS

Figure 1:
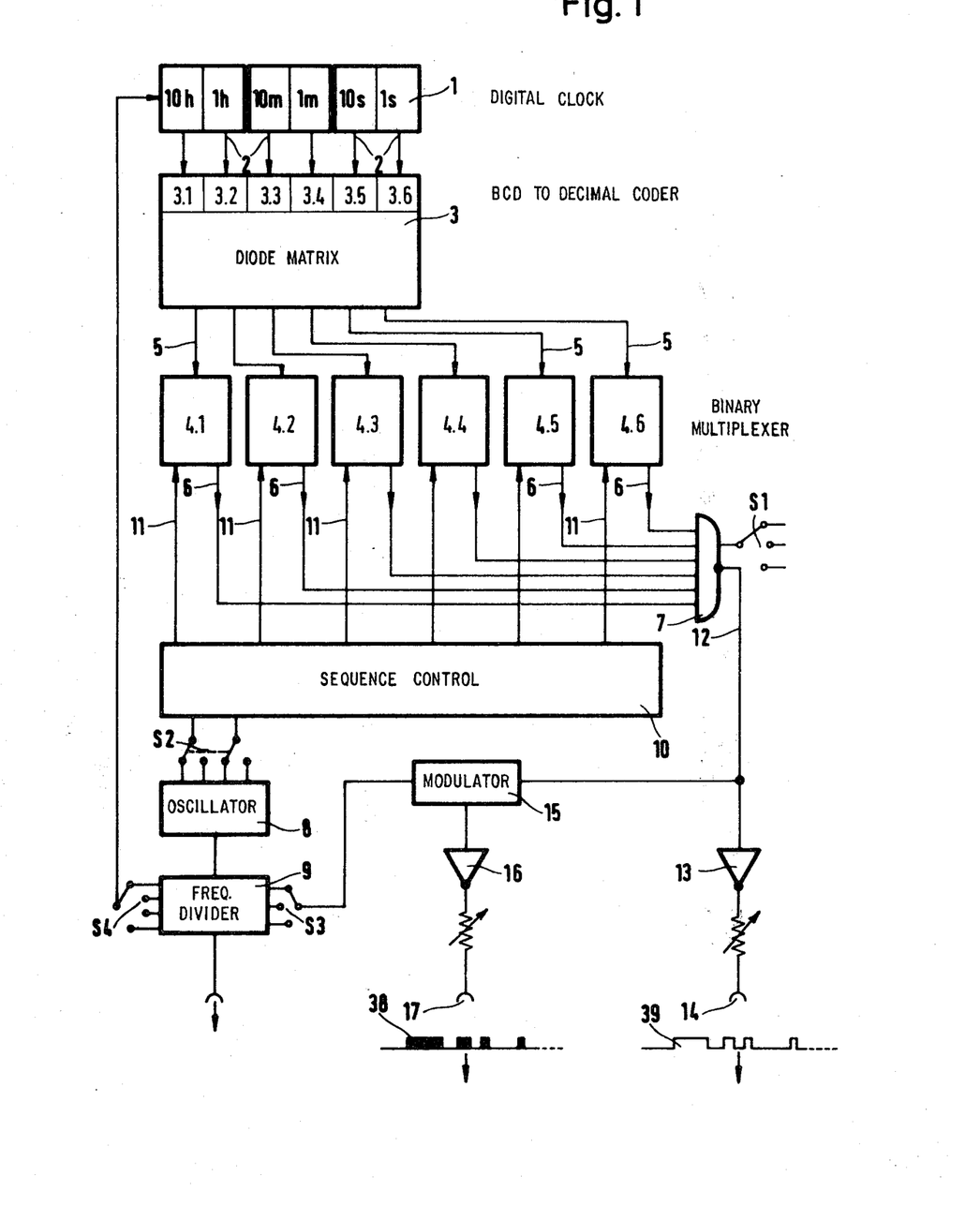
FIG. 1 is a block diagram of the time code generator.

The basic design of the time code generator is shown by the block diagram of FIG. 1. A six-digit digital clock 1 transmits in a BCD code the time information available at its outputs 2 to a diode matrix 3 through a BCD-to-decimal coder having six stages 3.1 to 3.6. Each digital clock digit has associated therewith a corresponding binary multiplexer stage 4.1 to 4.6 of a binary multiplexer 4, each stage being fed by 16 data inputs 5 from matrix 3.

The time code is formed so that the outputs 6 of all six binary multiplexer stages 4.1 to 4.6 are read out serially and the information transferred to a summing circuit consisting of a multiplexer NAND gate 7. An oscillator 8 having a 1 MHz quartz crystal and a frequency divider 9 for dividing the fundamental frequency of the oscillator into the submultiple frequencies required for clock pulse generation and modulation provide timing signals for the time code generator. A sequence control 10 for controlling, addressing and resetting the binary multiplex stages 4.1–4.6 is interposed between the oscillator 8 and the control inputs 11 of the binary multiplexer 4. The output 12 of the NAND gate 7 is connected, via a first amplifier 13, to a first output 14 of the time code generator to provide unmodulated signals and, via a modulator 15 and a second amplifier 16, to a second output 17 to provide modulated signals. The first output 14 is provided for the connection of visicorders and line recorders and the second output 17 for the connection of the audio channels of magnetic tape recorders.

A mode selection switch S1 controls the NAND gate 7 to permit selection of three states at the outputs 14 and 17 of the time code generator. These states, which are independent of the output of the digital clock 1 are normal operation, positive continuous signal and zero signal (stop). The continuous signal and the zero signal can be used to place start or calibration markers on the data carriers.

A period switch S2 interposed between the oscillator 8 and the sequence control 10 permits switching the period of the output signal to either one second or ten seconds. A modulation switch S3 disposed between the frequency divider 9 and the modulator 15 is used to set the modulation frequency. A time switch S4 is provided between the frequency divider 9 and the digital clock 1 to set the time on the digital clock 1.

Figure 2:
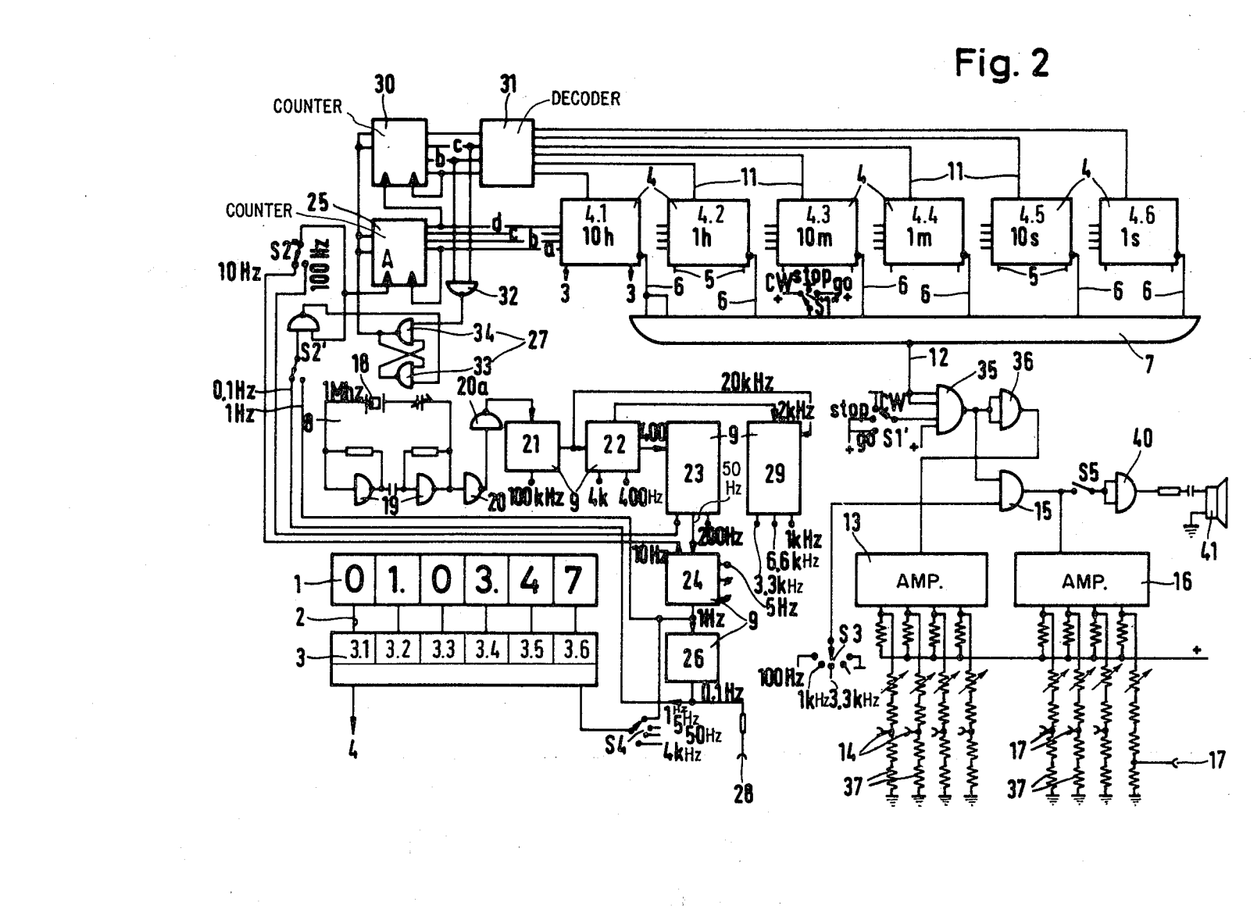
FIG. 2 is a complete circuit diagram of the time code generator.

Further details of the circuit arrangement of the time code generator are shown in FIG. 2 wherein frequency divider 9, consisting of six stages 21, 22, 23, 24, 26 and 29, generates the frequencies required for clock pulse generation and modulation from the oscillator 8 which has an output frequency of 1 MHz.

The oscillator 8 employs a 1 MHz quartz crystal 18 which is in series resonance with a circuit including two CMOS gates 19. Consequently, the crystal 18 can operate almost without load and permits the digital clock 1 to have a long-time accuracy of one second per day without temperature compensation. The quartz oscillator 8 is connected in series with gates 20 and 20a which increase the edge steepness and provide a buffer.

The input of frequency divider stage 21 is coupled to the output of buffer 20a and converts the 1 MHz oscillator frequency to outputs of 100 kHz and 20 kHz. The 20 kHz output of stage 21 is coupled to the inputs of frequency divider stages 22 and 29, stage 22 having output frequencies of 4 kHz, 2 kHz and 400 Hz. In stage 29, the 20 kHz signal is divided to provide signals of 6.6 kHz and 3.3 kHz, and a 1 kHz signal is obtained by dividing down the 2 kHz output of stage 22.

The 400 Hz output of stage 22 is coupled to the input of stage 23 which generates frequencies of 200 Hz, 100 Hz and 50 Hz, the 50 Hz signal driving stage 24 which in turn generates signals of 10 Hz, 5 Hz and 1 Hz. Frequency divider stage 26 is driven by the 1 Hz output of stage 24 and generates an output frequency of 0.1 Hz.

The output of the six stages of frequency divider 9 are summarized in the following Table.

| Divider State | Output Frequencies |
| --- | --- |
| 21 | 100 kHz, 20 kHz |
| 22 | 4 kHz, 2 kHz, 400 Hz |
| 23 | 200 Hz, 100 Hz, 50 Hz |
| 24 | 10 Hz, 5 Hz, 1 Hz |
| 26 | 0.1 Hz |
| 29 | 6.6 kHz, 3.3 kHz, 1 kHz |

The 100 Hz output of frequency divider stage 23 and the 10 Hz output of frequency divider 24 are connected via a switching contact S2″ of the period switch S2 to the input A of a first binary counter 25 which is used as the address counter for controlling the binary multiplexer 4. The 1 Hz output of frequency divider 24 and the 0.1 Hz output of frequency divider 26 are connected, via a switching contact S2′ of the period switch S2, to a reset stage 27. Switch S2 can be used to slow down the readout cycle of the binary multiplexer 4 by a factor of 10 while simultaneously the period duration can be switched from one to ten seconds within which the information available at the outputs 2 of the digital clock 1 is to be read out once. The 0.1 Hz output of stage 26 is also available at terminal 28 for external purposes, such as for use as an event marker for slow writing line recorders.

The frequencies of 400 Hz, 50 Hz and 5 Hz can be used to set the digital clock 1 stepwise to the correct time via the time switch S4. When the time switch S4 is in the 1 Hz position, the digital clock 1 operates in the normal mode.

The addressing counter 25 actuates the BCD inputs a through d of all six stages of the binary multiplexer 4 simultaneously. In the starting position at the beginning of a readout cycle, the addressing counter 25 is set to zero by a preceding reset pulse, the outputs a through d of the addressing counter 25 having a low voltage level "L". The clock pulses at the input A of the addressing counter 25 are frequency-divided in a ratio of 16:1 so that after every 16th pulse a control pulse is coupled to a follow-up binary counter 30.

A BCD-to-decimal decoder 31 which serves as a premultiplexer releases in steps. That is, after each sequence of 16 clock pulses one binary multiplexer stage after the other (via their control inputs 11) switch on (strobes) so that the respective 16 addresses are read out of stages 4.1, 4.2, 4.3, 4.4, 4.5 and 4.6 into the NAND gate 7. When the $n^{th}$ binary multiplexer stage has been read out, its control input 11 is blocked and the control input 11 of the $(n+1)^{th}$ binary multiplexer stage is enabled.

When all binary multiplexer stages 4.1–4.6 have been read out in a total of $6 \times 16 = 96$ steps, the follow-up counter 30 and the addressing counter 25 are reset and the next following period is initiated. This point in time then corresponds to the transition of a seventh strobe step. The binary outputs b and c of the follow-up counter 30 have low (L) potentials under these conditions causing a NAND gate 32, which is part of reset stage 27, to generate a reset pulse going toward zero. Two further NAND gates 33 and 34 which also form part of reset stage 27 and are connected as flip-flops actuate the parallel connected reset inputs of the addressing counter 25 and the follow-up counter 30 causing them to be reset.

Since immediately thereafter the binary outputs b and c of the follow-up counter 30 are again at zero potential, the flip-flop formed of the NAND gates 33 and 34 flops back to its starting position and releases the addressing counter 25 and the follow-up counter 30 for the counting sequence of a new period.

The time code signal present at the output 12 of the NAND gate is initially inverted and is converted to the desired form by a NAND gate 35 operating as a program switch. The mode switch S1, in cooperation with the NAND gate 35 and independent of the position of the digital clock 1, permits the setting of three modes for the time code generator. In addition to the normal G0 mode, it is possible to set at the outputs 14 and 17 of the time code generator either a continuous L signal (CW) or a continuous zero signal (STOP). This may be done, for example, to mark the start of an experiment or for calibration purposes.

The time code signal appearing at the output of the NAND gate 35 during normal operation is fed, via a buffer stage 36 comprising an AND gate, directly to the first amplifier 13 which is a quadruple booster amplifier. The output of the NAND gate 35 is also connected to one of the two inputs of the AND gate forming the modulator 15, whose second input can be selectively switched by the modulator switch S3 to the 3.3 kHz or 1 kHz outputs of the frequency divider 29 or to the 100 Hz output of the frequency divider 23.

The rectangular time code signal modulated with one of these frequencies is transmitted to the input of the second amplifier 16 which, like amplifier 13, is a quadruple booster amplifier. Each of the four outputs of the first and second amplifiers 13 and 16 is connected to a resistance divider 37 having resistance elements designed to minimize short-circuiting of the signal outputs 14 and 17. The modulated and the unmodulated signals 38 and 39 are available at different and freely selectable levels between 0 and 1 volt.

The output of the modulator 15 is connectable, via a switch S5, to a loudspeaker 41 through an AND gate 40. This circuit permits the time code signal to be made audible by means of the loudspeaker 41.

Figure 3:
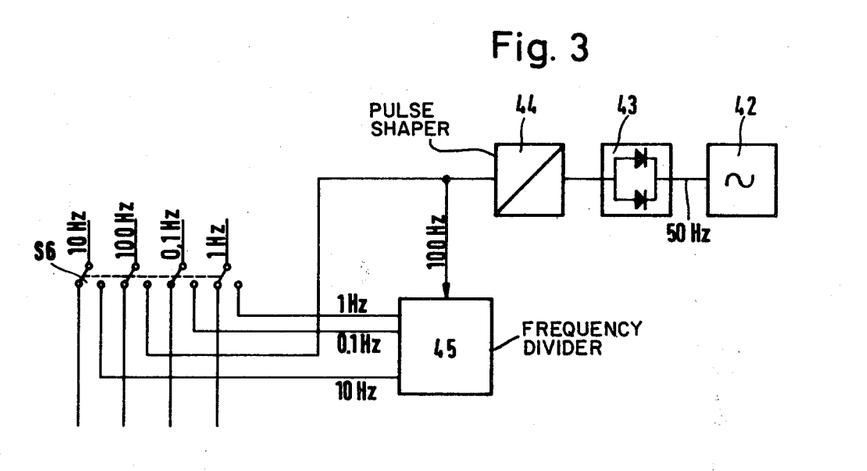
FIG. 3 shows a circuit for switching from quartz crystal to power line operation.

In certain applications, power line synchronization of the digital clock 1 may be advantageous. FIG. 3 shows a circuit for switching the time code generator from operation by the quartz crystal oscillator 8 to power line frequency operation. Assuming that the power system operates at a frequency of 50 Hz, the power source 42 is converted by a full wave rectifier 43 and series-connected pulse-shaping network 44 into a 100 Hz rectangular signal which is divided by a frequency divider 45 into signal frequencies of 10 Hz, 1 Hz and 0.1 Hz. The outputs of the frequency divider 45 and the 100 Hz output of the pulse-shaping network 44 are connected to a first set of four fixed switching contacts of a source switch S6. A second set of four fixed switching contacts of switch S6 are connected to the corresponding signal frequency outputs of the frequency divider stages 24, 26 and 23 shown in FIG. 2 and four common movable contacts of the switch S6 are connected to addressing counter 25 and to the reset stage 27.

Figure 4:
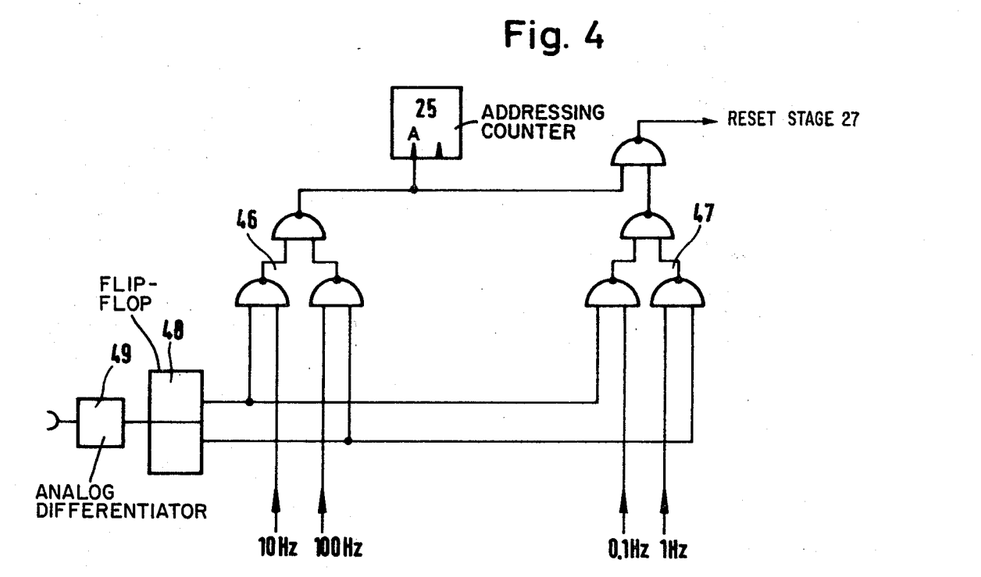
FIG. 4 shows a circuit for automatic switching of the period duration.

Another embodiment of the invention, which provides automatic switching of the period duration between ten seconds and one second, is illustrated in FIG. 4. The switching criterion employed is a predetermined value of the change in time of the measured value whose measured signal recording is to be time coded. Switches for the clock pulse and the gating time of the period are simple gate arrangements 46 and 47 which effect a frequency selection which is dependent upon the initial state of a flip-flop 48. This circuit operates without chatter so that the clock pulse and the period are always in strict synchronism. The flip-flop 48 is connected in series with an analog differentiating stage 49 which responds, for example, to the first derivative of a signal time function of a measured signal U and triggers the flip-flop 48 whenever the value dU/dt falls above or below a predetermined threshold value.

Figure 5:
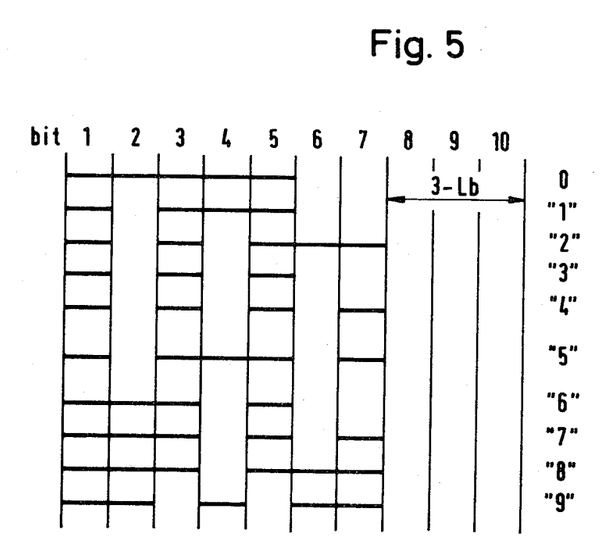
FIG. 5 illustrates the numerical symbols for the code.

FIG. 5 is a diagram illustrating the symbols for the numbers 0 to 9 of the code employed. The code consists of a minimum Morse Code with a word length of 10 bits, with a maximum of 7 initial character bits which are separated from the subsequent word by three empty bits. The bit length is set to 1/100 of a period. This code offers the advantage of a highly precise time grid with the following defined times:

One-second period: bit length 10 ms, word length 100 ms.

Ten-second period: bit length 100 ms, word length 1 s.

If even smaller time steps are required, the initial pulse sequence may be modulated. The modulation frequencies are synchronized to the clock or code pulses in rigid phase position and permit a time resolution to 50 $\mu$s at a modulation frequency of 20 kHz.

Figure 6:
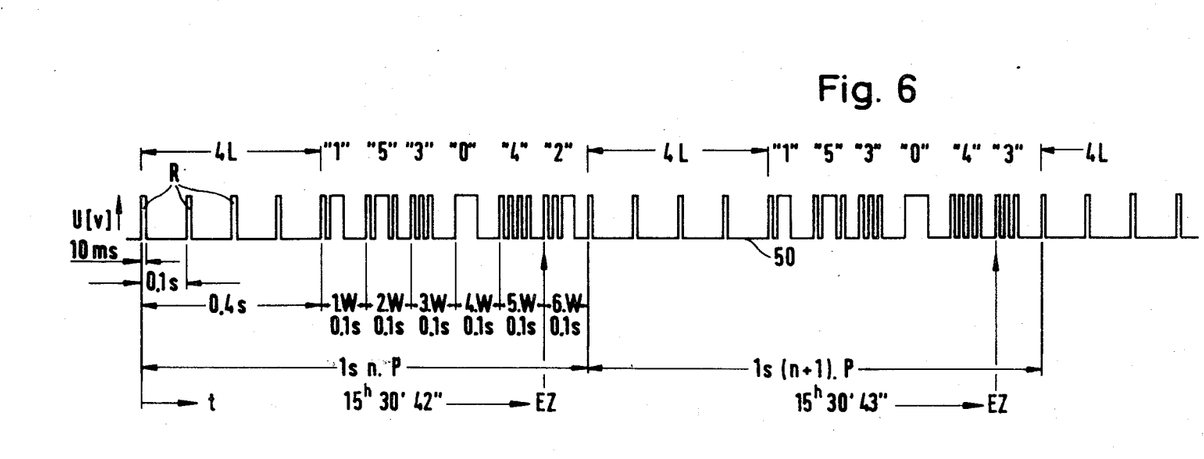
FIG. 6 is a diagram showing the output pulses over a period having a duration of one second.
Figure 7:
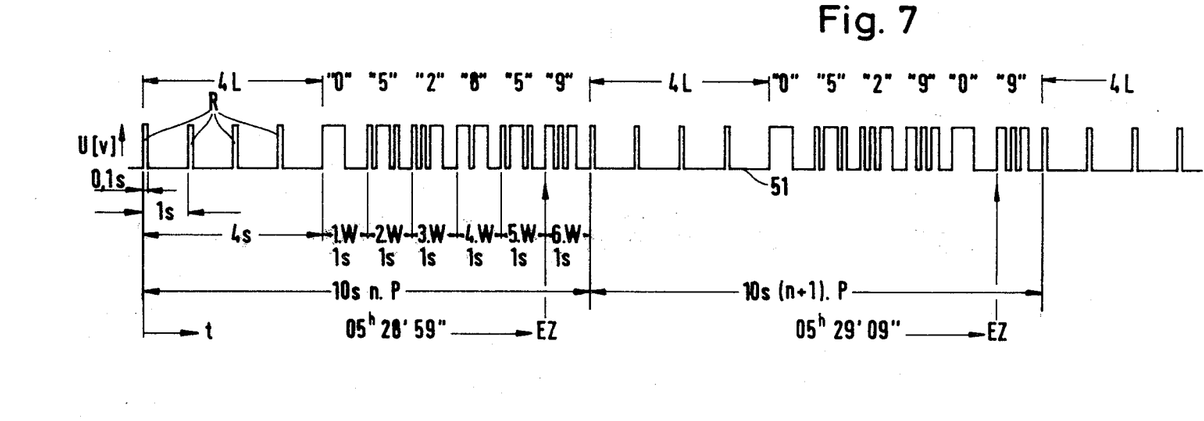
FIG. 7 is a diagram showing the output pulses over a period having a duration of ten seconds.

The pulses emitted at the output 14 of the time code generator may form, for example, the pulse sequence 50 shown in FIG. 6 which has a one-second period duration. Each period P begins with four empty steps L, and each empty step L has a duration of 0.1 s and is initiated by a rectangular pulse R of 10 ms duration. 0.4 second after the beginning of the period, the first word W begins with a rectangular pulse R and a word length of 0.1 second and, up to the end of the period, every four empty steps are followed by 6 word bits W. In the example, the time in the $n^{th}$ period is coded as 15 hours, 30 minutes, 42 seconds and in the $(n+1)^{th}$ period the time is coded as 15 hours, 30 minutes, 43 seconds. The real time EZ of the time coded in a predetermined period n always occurs at the beginning of the sixth word bit. A corresponding pulse sequence 51 with a period duration of ten seconds and a word bit length of one second, but otherwise the same, is shown in FIG. 7 for the real times EZ of 5 hours, 28 minutes, 59 seconds and 5 hours, 29 minutes, 9 seconds.

Figure 8:
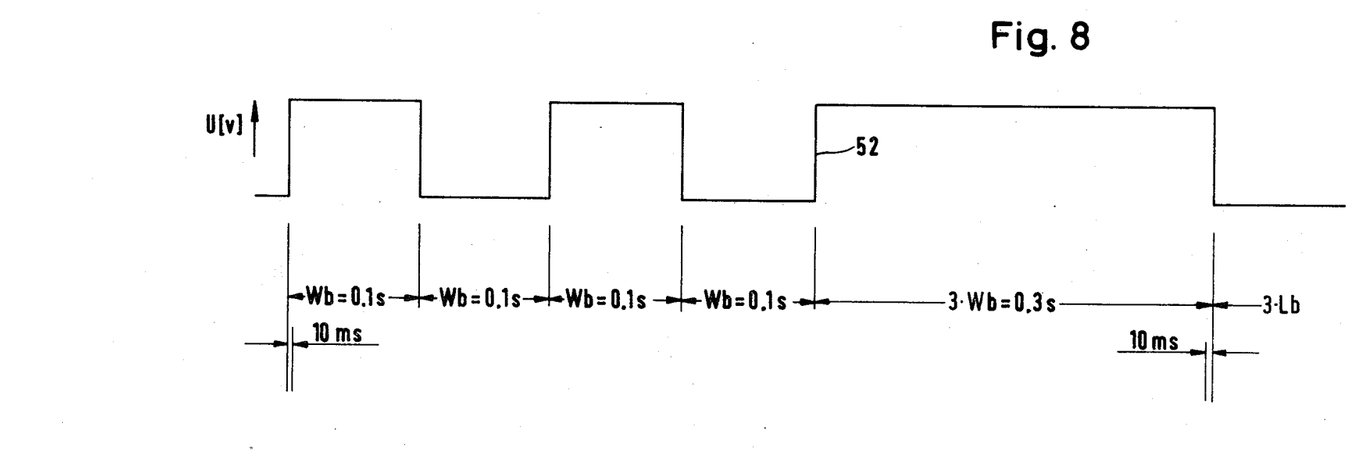
FIG. 8 depicts the unmodulated coding and FIG. 9 the modulated coding.
Figure 9:
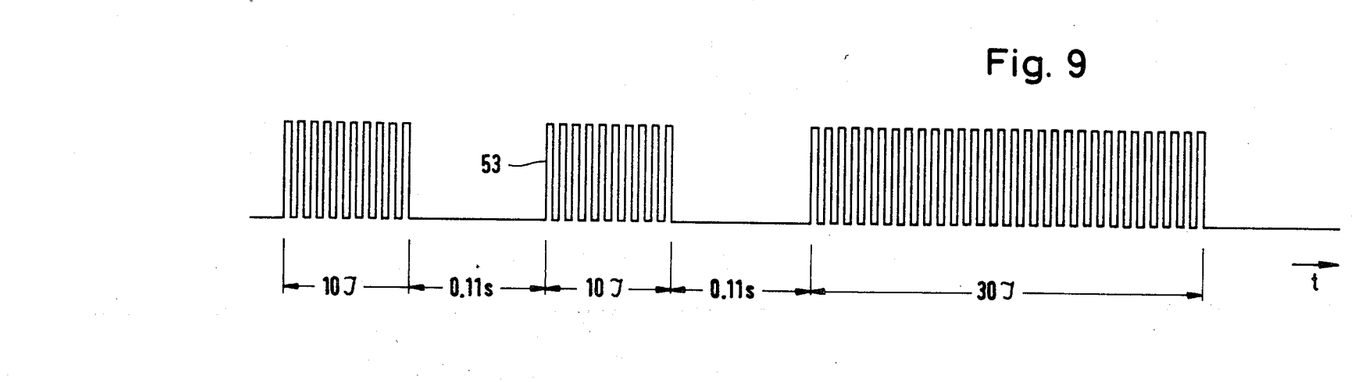

FIG. 8 shows a pulse sequence 52 for the number "2" according to the number code shown in FIG. 5 with a word length W of one second and seven word bits Wb and three empty bits Lb each 0.1 second. FIG. 9 shows the same pulse sequence 53 as is shown in FIG. 8 but the word bits Wb and the empty bits Lb are modulated with a modulation frequency of 100 Hz. This produces per word bit of 0.1 s duration, ten pulses of 0.01 s spacing which permits an even finer subdivision of the time code.

Figure 10A:
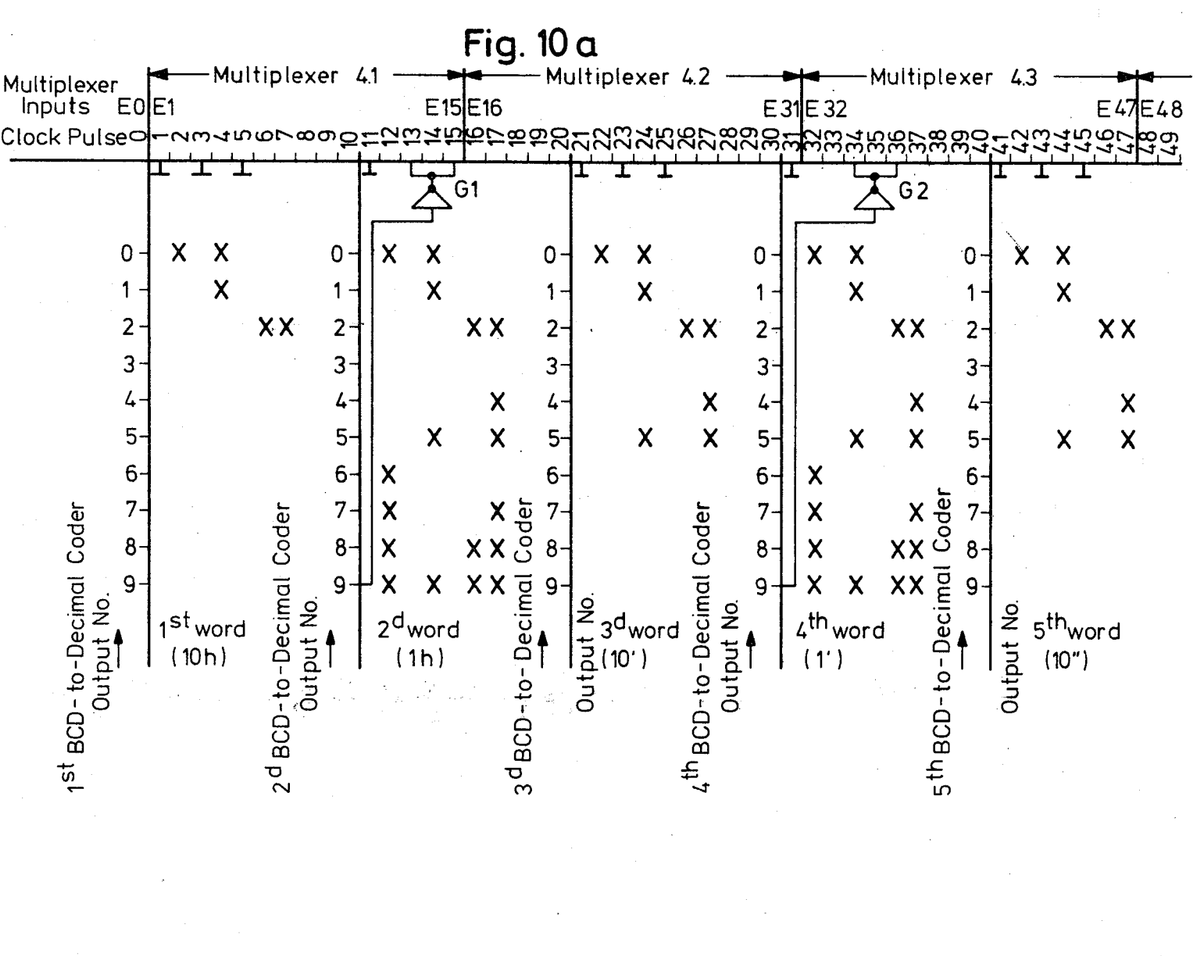
FIGS. 10a and 10b are schematic representations of a diode matrix used in the time code generator of FIGS. 1 and 2.
Figure 10B:
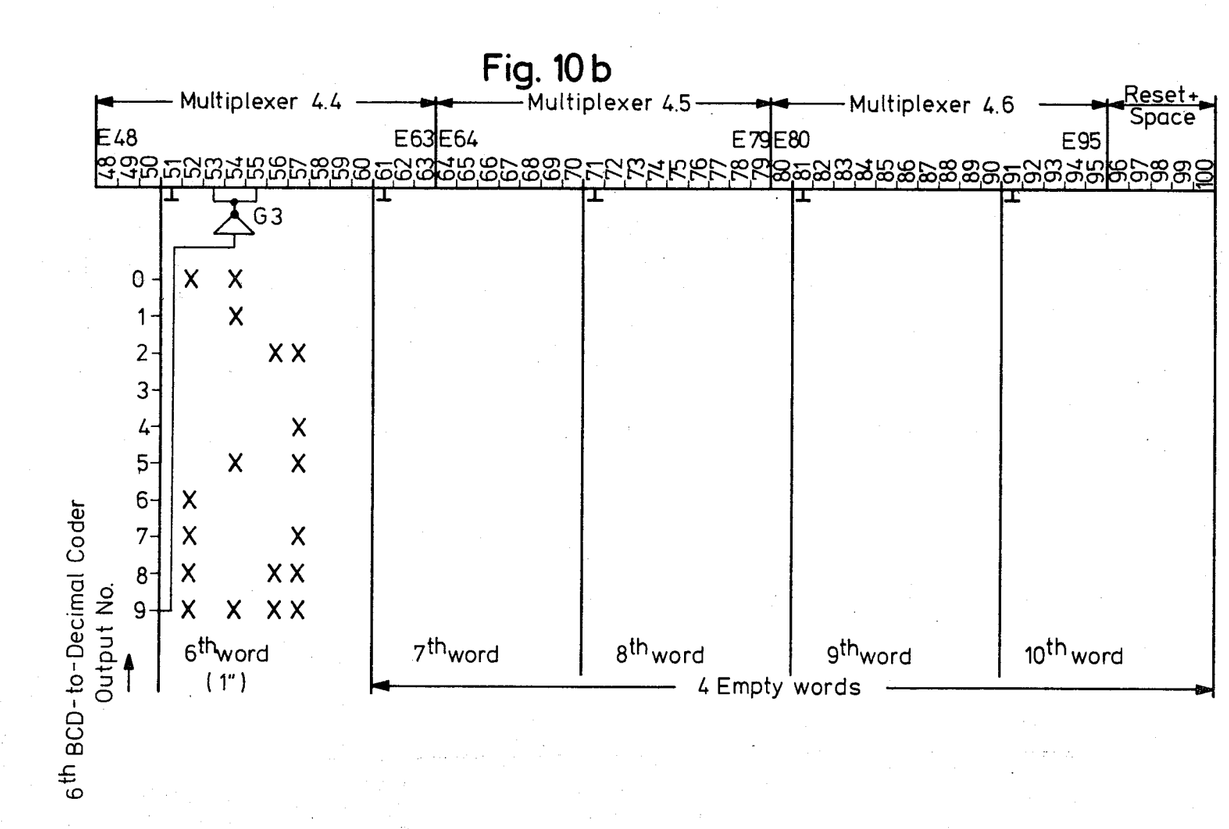

FIGS. 10a and 10b are schematic representations of diode matrix 3 coupling the terminals $E_0$ to $E_{95}$ of the six binary multiplexer stages 4.1 to 4.6 to the corresponding terminals 0 to 9 of each of the BCD-to-decimal coder stages 3.1 to 3.6. The points of intersection linked by diodes are indicated by the symbol X. The diode matrix 3 serves the purpose of converting the serially read out BCD coded contents of the digital clock 1 to the readable serial pulse code shown in FIG. 5. It comprises a crossbar distributor in which the crossover points which are to be through-connected are occupied by diodes.

In operation, the BCD code of the digital clock 1 is converted to a decimal code by means of BCD-to-terminal coder stages 3.1 to 3.6 which are integrated into the diode matrix 3. For example, a "2" as the first highest order clock digit in a display "20", "21", "22", or "23" hours corresponds to a logic L actuation of the output "2" of the multiplexer stage 4.1 belonging to the highest order hours indicator of the digital clock 1. The "L" going output puts the inputs of the multiplexer stage 4.1 which belong to the highest order hour display at the "L" potential. However, since the inputs E1, E3 and E5 of multiplexer stage 4.1 are permanently wired for logic L actuation and the inputs $E_8$ through $E_{10}$ remain open ("H" potential), a corresponding pulse train LHLHLLLHHH is generated when all of the first ten multiplexer data inputs are read out and this corresponds to the number "2". Since the multiplexer stages simultaneously have the characteristic of an inverter, the pulse train HLHLHHHLLL appears at the first multiplexer stage 4.1 for the number "2" which corresponds to the code of FIG. 5.

Only three outputs of the associated BCD-to-decimal coder stage 3.1 are required for the highest order hours since the highest order digit of a digital clock can only be a two. Since the lowest order hour display goes from 0 to 9, all ten outputs of the associated BCD-to-decimal coder stage 3.2 are required. However, for the highest order minutes and highest order seconds displays, only six digits need be distinguished since the display jumps from 59' to 00' or from 59" to 00", respectively.

By permanently wiring some multiplexer inputs to the "L" level, the pulse code shown in FIG. 5 is generated with a minimum number of diodes. For this purpose, there are also provided three inverters $G_1$, $G_2$ and $G_3$ whose inputs go to "L" potential only at the clock number "nine" corresponding to the logic "H" output level of the BCD-to-decimal coder which controls the matrix so that only at this number the multiplexer inputs connected with the output of the respective inverter are set to "H". The following level sequence results for the lower order hour indication "9" at the input of the respective binary multiplexer stages 4.1 and 4.2: LLHLHLLHHH for the word "nine" of the ten-bit lower order hour indication.

The "L" of the first bit is permanently wired, the third and fifth bits are set to "H" by the inverter G1, the open inputs E8, E9, E10 correspond to "H" and the inputs E2, E4, E6, E7 are set to "L" via the diodes of the diode matrix 3. At the output of the lower order hour multiplexer stage, there appears the inverted signal: HHLHLHHLLL which corresponds to the "9" in the pulse code of FIG. 5.

Since each of the binary multiplexer stages has 16 inputs and a number word has only ten bits, four multiplexer stages with a total of 64 inputs E0 to E63 are initially sufficient for the six digits of the clock, each with ten bits, i.e., a total of 60 bits. The inputs E1 to E63 of the binary multiplexer stages 4.1 to 4.4 are thus continuously occupied by the 6×10 word steps while input E0 remains unoccupied to effect during this step time the resetting and restarting of the readout cycle. The two further binary multiplexer stages 4.5 and 4.6 have only a few fixed "L" inputs to mark the beginning of the empty word steps, each with a word length of ten bits.

A complete time information in the form xx$^h$xx'xx" is considered a "period". Each period include six clock digit words and four empty words; i.e., a total of ten words. Each word has ten steps=ten bits. Of these, the first seven bits are used for the pulse code. The three bits supplementing the ten are empty bits to separate the next following words.

It will be understood that the above description of the present invention is susceptible to various modifications, changes and adaptations, and the same are intended to be comprehended within the meaning and range of equivalents of the appended claims.

Figure 11:
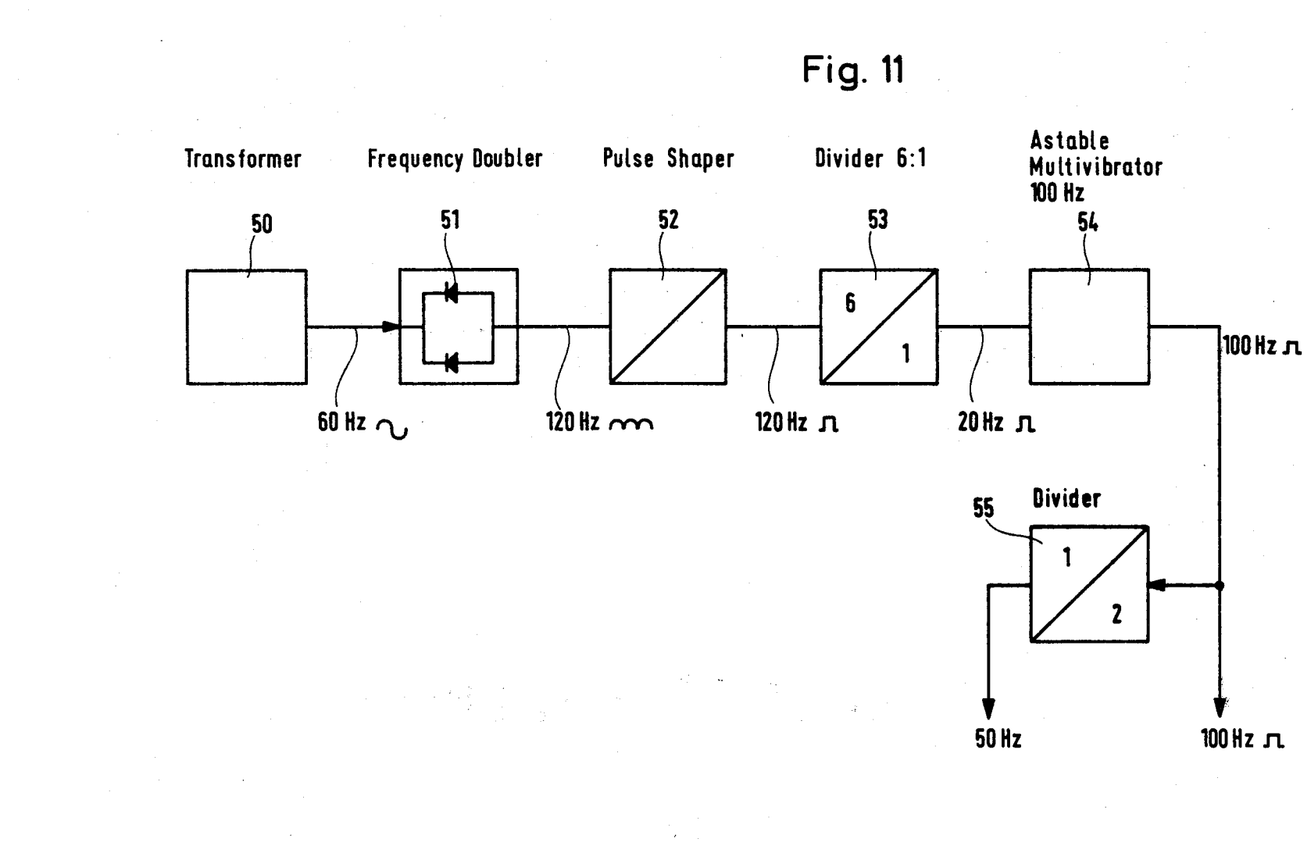
FIG. 11 shows a circuit for the 50 Hz and 100 Hz signal generation from a 60 Hz power line frequency.

For the alternative operation with a 60 Hz power line frequency the reference 50 Hz and 100 Hz clock frequencies become generated by a 100 Hz astable multivibrator oscillator 54 which is synchronized by its fifth subharmonic f=20 Hz. The block diagram in FIG. 11 shows the 60 Hz input power line voltage which is transformed to 5 volts AC by a step down transformer 50. The subsequent frequency doubler 51 consists of a full wave rectifier and it generates cosinusoidal 120 Hz signal which is applied to a pulse shaping network 52 providing a rectangular 120 Hz pulse signal. The 6 by 1-devider stage 53 generates a 20 Hz synchronizing signal to the signal-input of the astable multivibrator 54 which synchronizes it in a locked phase relation. The 100 Hz signal output from 54 is directly available for the internal requirements of the clock, i.e. for counter 25 and for the modulating gate 15. The further needed 50 Hz signal for the clock setting is obtained by use of a 2-to-1 devider stage 55 which is a flip-flop deviding the applied 100 Hz by a factor of two.

Both frequencies 50 Hz and 100 Hz are thus phase locked to the 60 Hz power line frequency.

What is claimed is:

1. A time code generator for generating a time-coded pulse sequence comprising:
   a digital clock for generating time information at six output terminals thereof in a BCD code;
   six BCD-to-decimal coder stages, each stage having ten output terminals and an input coupled to a corresponding output terminal of said digital clock;
   six binary multiplexer stages, each having a control input, four BCD inputs and sixteen data input terminals;
   a diode matrix coupling the ten output terminals of each of said BCD-to-decimal coder stages to selected data input terminals of said binary multiplexer stages;
   a clock pulse generator for generating clock pulses at a predetermined frequency, said clock pulse generator including:
   a quartz crystal for generating time reference signals,
   an addressing counter coupled to the BCD inputs of said binary multiplexer stages for generating the lower order addresses thereof, and
   a reset stage coupled to said addressing counter for generating a reset signal after the one-hundredth clock pulse;
   a decoder coupled to the control inputs of said binary multiplexer stages;
   a follow-up counter coupled to said address counter and said decoder for serially energizing said binary multiplexer stages;
   a frequency divider coupled to said clock pulse generator for generating pulses at predetermined submultiples of the frequency of said time reference signals, the pulses at the output of said frequency divider being coupled to and controlling said digital clock, address counter, follow-up counter, decoding and binary multiplexer stages;
   a multiplexer NAND gate coupled to the outputs of said six binary multiplexer stages;
   a mode switch connected to the output of said NAND gate;
   first and second output signal amplifiers coupled to said mode switch;
   a modulator having its output coupled to the input of said second output signal amplifier; and
   a modulator switch for connecting the output of said frequency divider to said modulator, the output of said first signal amplifier being unmodulated and the output of said second signal amplifier being modulated by an output of said frequency divider.

2. A time code generator as defined by claim 1 which further comprises a further frequency divider having its input coupled to a source of power line frequency, and a source switch for selectively coupling said addressing counter and reset stage to either the outputs of said further frequency divider or the outputs of said frequency divider.

3. A time code generator as defined by claim 2 wherein said frequency divider comprises first, second, third, fourth, fifth and sixth stages, said third stage having an output of 100 Hz, said fourth stage having outputs of 10 Hz and 1 Hz and said fifth stage having an output of 0.1 Hz.

4. A time code generator as defined by claim 3 wherein said power line frequency is 50 Hz, said source switch has first and second sets of fixed contacts and a set of movable contacts, and which further comprises a full wave rectifier and a pulse-shaping stage connected to said source of power line frequency, the output frequency of said pulse-shaping stage being 100 Hz and the output frequencies of said further frequency divider being 10 Hz, 1 Hz and 0.1 Hz, the output of said pulse-shaping stage and the outputs of said further frequency divider being coupled to said first set of fixed contacts, the outputs of said third, fourth and fifth stages of said frequency divider being coupled to said second set of fixed contacts and said set of movable contacts being coupled to said addressing counter and said reset stage.

5. A time code generator as defined by claim 1 which further comprises means for automatically switching between one second and ten seconds output pulse durations comprising:

a differentiating stage which responds to the first derivative of the signal time function of a measured signal;

a flip-flop stage having first and second outputs and coupled to the output of said differentiating stage;

first, second, third and fourth NAND gates, each having two inputs and an output, one input of each of said first and third NAND gates being coupled to the first output of said flip-flop stage and one input of each of said second and fourth NAND gates being coupled to the second output of said flip-flop stage, the other inputs of said first, second, third and fourth NAND gates being coupled to the 10 Hz, 100 Hz, 0.1 Hz and 1 hz outputs of said frequency divider, respectively;

a fifth NAND gate having one input coupled to the outputs of said first and second NAND gates and to the input of said addressing counter and its other input coupled to the outputs of said third and fourth NAND gates, the output of said fifth NAND gate being coupled to said reset stage.

* * * * *